United States Patent
Dinesh et al.

(10) Patent No.: US 9,178,990 B2
(45) Date of Patent: Nov. 3, 2015

(54) SYSTEMS AND METHODS FOR CHARACTERIZING LOOPS BASED ON SINGLE-ENDED LINE TESTING (SELT)

(75) Inventors: Vaibhav Dinesh, Dehli (IN); Kunal Raheja, Noida (IN); Patrick Duvaut, Tinton Falls, NJ (US)

(73) Assignee: IKANOS COMMUNICATIONS, INC., Fremont, CA (US)

( * ) Notice: Subject to any disclaimer, the term of this patent is extended or adjusted under 35 U.S.C. 154(b) by 1944 days.

(21) Appl. No.: 12/164,488

(22) Filed: Jun. 30, 2008

(65) Prior Publication Data
US 2009/0323902 A1 Dec. 31, 2009

(51) Int. Cl.
*H04M 3/08* (2006.01)
*H04M 3/30* (2006.01)
*H04B 3/46* (2015.01)

(52) U.S. Cl.
CPC *H04M 3/306* (2013.01); *H04B 3/46* (2013.01)

(58) Field of Classification Search
CPC ....... H04M 1/24; H04M 3/2209; H04M 3/30; H04M 3/085; H04M 3/301; H04M 9/082; H04B 3/23; H04B 3/46; H04B 3/20
USPC ............ 379/1.01, 1.03, 1.04, 3, 14.01, 22.01, 379/22.04, 23, 24, 27.01, 27.03, 29.01, 379/29.05, 29.1, 22, 406.01–406.16
See application file for complete search history.

(56) References Cited

U.S. PATENT DOCUMENTS

2005/0163287 A1* 7/2005 Ouyang et al. ..................... 379/3
2006/0120442 A1* 6/2006 Melsa et al. ................... 375/222
2006/0251160 A1* 11/2006 Fazlollahi et al. ............ 375/222
2008/0089485 A1* 4/2008 Duvaut et al. ................ 379/1.03
2008/0279269 A1 11/2008 Duvaut et al.
2009/0245476 A1* 10/2009 Lindqvist .................. 379/32.04

OTHER PUBLICATIONS

Stefano Galli et al, "Loop Makeup Identification via Single Ended testing: beyond Mere Loop Qualification", IEEE Journal on Selected Areas in Communications, vol. 20, No. 5, Jun. 2002.
T. Bostoen, P. Boets, M. Zekri, L. V. Biesen, T. Pollet and D. RaAbijns, "Estimation of the Transfer Function of a Subscriber Loop by means of a One-Port Scattering Parameter Measurement at the Central Office," IEEE Journal on Selected Areas in Communications, vol. 20, No. 5, pp. 936-948, Jun. 2002.

* cited by examiner

*Primary Examiner* — Akelaw Teshale
(74) *Attorney, Agent, or Firm* — Pillsbury Winthrop Shaw Pittman LLP

(57) ABSTRACT

Systems and methods for characterizing loops based on frequency domain reflectometry single-ended line testing (FDR-SELT) are described. One embodiment includes a method for determining whether a straight-loop departure condition exists on a loop under test. First, an un-calibrated echo signal is received. A region associated with the loop under test, a platform type, and estimated the length of the loop under test are then used together with the received un-calibrated echo signal to determine whether the loop is not a straight loop is determined through determining whether at least one differentiating feature is present in the received signal. Another embodiment includes a method for determining a loop gauge for a loop under test through analyzing characteristics relating to local maxima and local minima of the received un-calibrated echo signal using the region, platform type, and the estimated loop length.

23 Claims, 16 Drawing Sheets

SYSTEMS AND METHODS FOR CHARACTERIZING LOOPS BASED ON SINGLE-ENDED LINE TESTING (SELT)

TECHNICAL FIELD

The present disclosure generally relates to point-to-point wire line communications and more particularly to single-ended loop testing of digital subscriber line (DSL) communication systems.

BACKGROUND

Prior to deploying xDSL transmissions, a subscriber loop is generally qualified or characterized by estimating the channel capacity, which depends on the transfer function of the network. The subscriber loop (or line) connects the customer premises (CP) to the central office (CO) and can be affected by a wide range of impairments, including but not limited to, load coils, bridge taps, mixed wire gauges, and bad splices. While the loop length and the wire gauge of the loop are generally not considered actual impairments, they can also have a large impact on xDSL transmissions. Other impairments include split pairs, untwisted drop cables, radio-frequency interference (RFI), and cross-talk. Moreover, several of the impairments mentioned above for xDSL transmissions are not present for POTS (plain old telephony service) because xDSL exploits a much wider frequency band as compared to POTS. Consequently, the existing POTS testing equipment is not capable of qualifying a subscriber loop for xDSL transmission.

Due to these impairments, the xDSL network termination (NT) installed at the CP may in some cases not even link up with the xDSL line termination (LT) in the DSL access multiplexer (DSLAM) at the CO. If the xDSL modems do link up with one another, there is no guarantee with respect to the quality-of-service (QoS) in terms of bit rate. Qualifying a subscriber loop for xDSL requires estimating its channel capacity, which depends on the attenuation of the line and also on the noise power spectral density (PSD) at the CO for upstream reception and at the CP for downstream reception, respectively. The estimate of the channel capacity of a particular loop/line will be most accurate if the transfer function of the line and the noise PSD at the CO and CP are measured directly.

Conventional methods for qualifying a subscriber loop include use of xDSL test units available on the market that are capable of performing such measurements. In addition, these test units are often combined with a "golden" modem plug-in module that emulates a real xDSL modem of a certain type, such as ADSL, in order to estimate the real bit rate instead of only the theoretical channel capacity. However, this approach requires sending a technician to the CP, which is very expensive.

Single-ended loop testing (SELT) can be used to extract information about the transmission environment (e.g., the loop) in a DSL system by performing reflective measurements remotely at the CO/CPE terminal, without the need to dispatch a technician. As an example, SELT may comprise injecting signals into a loop under test at a central office (CO) in order to determine the loop capability for supporting different kinds of DSL services. As such, SELT often plays an important role in DSL provisioning and maintenance.

SUMMARY

Briefly described, one embodiment, among others, includes a method for determining whether a straight-loop departure condition exists on a loop under test. In accordance with such embodiments, the method comprises receiving an un-calibrated echo signal for the loop under test using frequency domain reflectometry single-ended line testing (FDR-SELT), a region associated with the loop under test, a platform type, and a length of the loop under test. Based on the region, platform type, and loop length, the method further comprises determining whether the loop is not a straight loop, wherein determining whether the loop is not a straight loop comprises determining whether at least one differentiating feature is present in the un-calibrated echo signal.

Another embodiment includes a method determining a loop gauge for a loop under test. The method comprises receiving an un-calibrated echo signal for the loop under test using frequency domain reflectometry single-ended line testing (FDR-SELT), a region associated with the loop under test, a platform type, and a length of the loop under test. Based on the region, platform type, and loop length, the method further comprises analyzing characteristics relating to local maxima and local minima of the un-calibrated echo signal to determine the loop gauge.

Yet another embodiment is a system that comprises a first module coupled to a loop, wherein the first module is configured to generate a test signal and receive an un-calibrated echo response of the loop. In accordance with such embodiments, the system further comprises a second module configured to receive the un-calibrated echo response measurement from the first module, wherein the second module is further configured to receive a region, platform type, and a loop length and determine whether the loop is not a straight loop by determining whether differentiating characteristics are present in the un-calibrated echo signal.

Another embodiment is a system that comprises a first module coupled to a loop, wherein the first module is configured to generate a test signal and receive an un-calibrated echo response of the loop. The system further comprises a second module configured to receive a region, platform type, and a loop length, wherein the second module is further configured to determine loop gauge of the loop based on the region, platform type, and loop length by analyzing characteristics relating to maxima and minima of the un-calibrated echo signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

Figure 1:
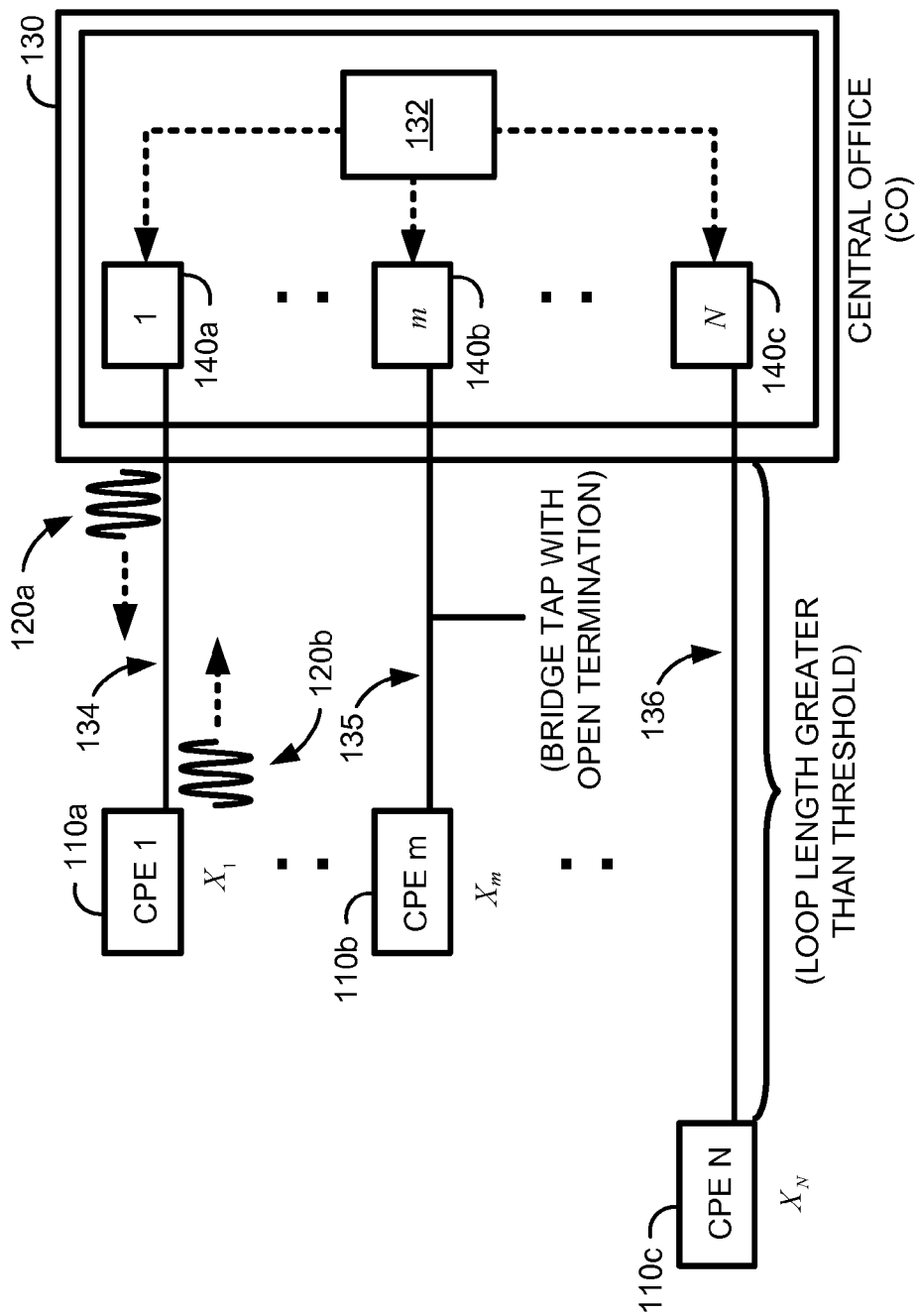
FIG. 1 illustrates an xDSL system in which embodiments of FDR-SELT are applied.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In a wire-line broadband system, one of the primary objectives is to qualify a subscriber-loop for xDSL transmission by estimating its channel capacity. This can be achieved if the loop characteristics such as the topology, loop-length and gauge are known. These loop characteristics also serve as useful tools for trouble-shooting and diagnostic purposes in the event that a provisioned service experiences problems or fails.

As discussed earlier, SELT, or single-ended loop testing, can be used to extract valuable information about the transmission environment (e.g., the loop) in a DSL system by performing reflective measurements remotely at the CO/CP (or Modem) terminal, without the need to dispatch a technician. One approach to using SELT involves "per-port calibration," which relates to removing near-end echo, stemming from the measurement equipment, on a per-port basis at the factory. The data derived at the factory for each port is shipped to end users for them to calibrate their equipment. Equipment vendors, however, incur increased equipment cost and operation costs for incorporating calibration data. Furthermore, end users incur the cost of associating the calibration data with the physical units.

Systems and methods are thus described herein for analyzing the un-calibrated echo ($S_{11}(f)$) in the frequency domain to estimate the loop characteristics discussed above. It should be appreciated that with exemplary embodiments described herein, the use of un-calibrated FDR-SELT techniques avoids the need for conducting a set of reference measurements for each port at the manufacturing plant and storing these measurements for future access. The systems and methods described herein function independently of the port employed in conducting FDR-SELT measurements. It should also be emphasized that the systems and methods for using un-calibrated FDR-SELT measurements may be applied across different central office (CO) platforms and any field deployment scenarios.

It should be noted that in describing representative embodiments herein, various embodiments may be presented as a particular sequence of steps. The methods or processes should not, however, be limited to the particular sequence of steps described. As one of ordinary skill in the art will appreciate, other sequences of steps may be possible, and the particular order of steps set forth herein should not be construed as limitations on the claims. In addition, the claims directed to the method and/or process of various embodiments should not be limited to the performance of their steps in the order written, and one skilled in the art can readily appreciate that the sequences may be varied and still remain within the spirit and scope of the present invention.

Un-Calibrated SELT-FDR Analysis Framework

One technique used for gathering SELT measurements is frequency-domain reflectometry (FDR) where a frequency sweep is performed on the loop under test in order to derive frequency-selective characteristics. For example, peaks in the measured receive signal correspond to frequencies that create standing waves. Measurement of the one-port scattering parameter involves determining the echo response of the loop. For purposes of nomenclature used herein, the echo response may also be referred to as S11, $S_{11}(f)$, or echo signal, and the loop under test may also be referred to as Device Under Test (DUT). Furthermore, the term "raw" echo signal is used to refer to the un-calibrated nature of the measured echo signals. Based on the echo response, the input impedance of the loop as a function of frequency can be determined from which loop characteristics can be estimated. Such characteristics may include, for example, loop length and loop termination type.

When performing single-ended loop testing (SELT), various factors can affect the accuracy of the measurements and ultimately affect any estimations derived from the measurements. One factor is the presence of a long loop where the measuring capability of the system is exceeded. Another factor relates to the topology of the loop itself (such as those due to bridge taps, for example). Accordingly, embodiments described herein for performing SELT indicate when such factors exist, as they can result in erroneous estimations. Systems and methods are described for capturing and analyzing frequency domain reflectometry single-ended loop test (FDR-SELT) measurements to determine whether the response corresponds to a loop that is not a straight loop. Exemplary embodiments described herein are based on the un-calibrated FDR-SELT ($S_{11}(f)$) echo in the frequency domain and in particular, on the actual analysis of the un-calibrated echo signal. Based on this analysis, valuable loop information can be derived from different characteristics of the un-calibrated S11 signal.

It should be noted that exemplary embodiments described herein may also include the ability to flag S11 responses that are associated with very long loops in addition to the ability to detect inconsistent loop estimates. For purposes of nomenclature used herein, the term "Layer 0" generally refers to the phase of FDR-SELT whereby a signal is transmitted into the loop under test and the scattering parameters are captured. The term "Layer 1" generally refers to the post-processing phase whereby the data captured in Layer 0 is used to derive meaningful information relating to the DUT.

Reference is now made to FIG. 1, which illustrates an xDSL system in which embodiments of SELT are applied. In the non-limiting example shown in FIG. 1, N end users (or N sets of CPE 110a, 110b, 110c) are depicted where each user 110a, 110b, 110c is referenced using an index m. The end users 110a, 110b, 110c are connected via a loop to a central office (CO) 130, where a SELT module 132 for deriving loop characteristics based on un-calibrated FDR-SELT measurements may be implemented. The CO 130 may include an xDSL access multiplexer (DSLAM), xDSL line cards 140a, 140b, 140c, and other equipment for interfacing with end users 110a, 110b, 110c. In some embodiments, the SELT module may be incorporated into xDSL line cards 140a, 140b, 140c. In other embodiments, the xDSL line cards 140a, 140b, 140c may interface with the SELT module 132. It should be noted that while embodiments for SELT are described here in the context of central offices, the principles of SELT contained in this disclosure may also be incorporated into customer premises equipment as well.

The SELT module 132 first performs Layer 0 functions and injects a test signal 120a onto the loop under test. The reflected signal 120b is then measured to determine the echo response of the loop. The nature of the reflected signal 120b will vary depending on the characteristics of the loop. FIG. 1 shows three non-limiting examples of various loop configurations. Loop 134 is a straight loop configuration, whereas loop 135 and loop 136 depict a bridge tap loop and a long loop, respectively. Generally, the definition of a "long" loop may vary and is based on a predetermined threshold. As a non-limiting example, any loop that exceeds 4 km may be categorized as a long loop.

Figure 2A:
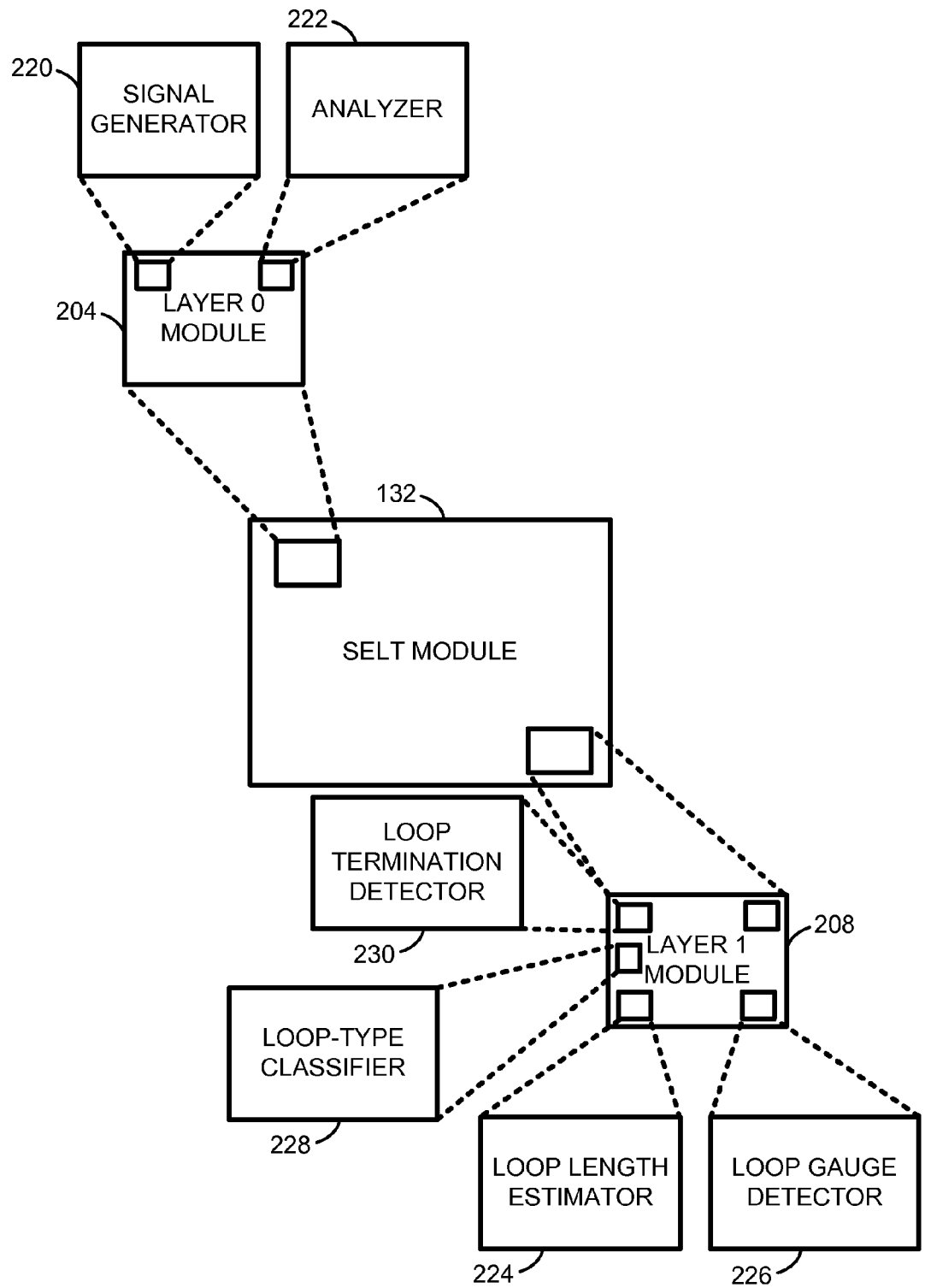
FIG. 2A depicts various components of the FDR-SELT module depicted in FIG. 1.

FIG. 2A depicts various components for the SELT module depicted in FIG. 1. In accordance with exemplary embodiments, the SELT module 132 may comprise a Layer 0 module 204 and a Layer 1 module 208. The Layer 0 module 204 may further comprise a signal generator 220 and an analyzer 222. The signal generator 220 transmits test signals on the loop under test. The analyzer 222 monitors the reflected signal to derive s-parameters associated with the network. The Layer 1 module 208 receives information from the Layer 0 module 204, including an un-calibrated S11 parameter. The Layer 1 module 208 may comprise a loop length estimator 224, a loop-type classifier 228, and a loop termination detector 230. For other embodiments, the Layer 1 module 208 may also include a loop gauge detector 226 if a priori knowledge of the loop gauge is not available.

Figure 2B:
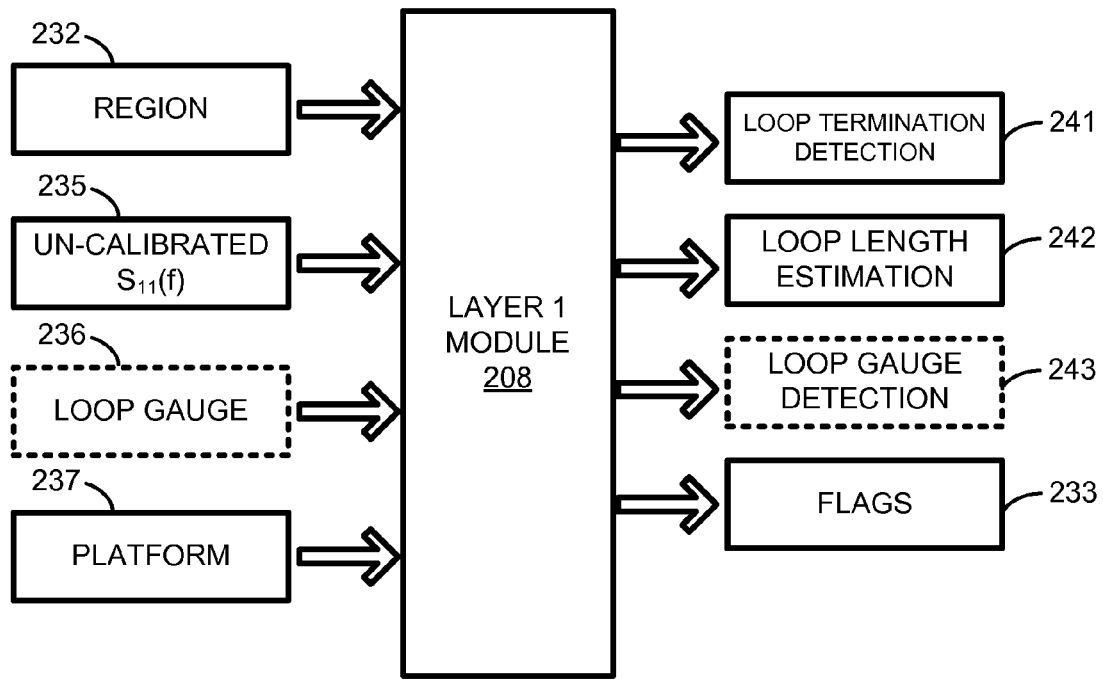
FIG. 2B depicts the signal flow for the Layer 1 module shown in FIG. 2A.

FIG. 2B depicts the signal flow for the Layer 1 module shown in FIG. 2A. Prior to deriving characteristics associated with the loop, the Layer 1 module 208 may receive such inputs as the region 232 associated with the loop. As non-limiting examples, the region may be designated as North America or Japan. The CO (or CPE) platform (i.e., board design information) 237 forms the second input. The un-calibrated S11 parameter 235 is also forwarded to the Layer 1 module 208. Finally, if a priori knowledge regarding the loop gauge is available, this information may also be forwarded to the Layer 1 module 208. It should be noted that for embodiments described herein, loop length estimates can be derived for straight loops up to a predetermined threshold without prior knowledge of the loop gauge. For some embodiments, this predetermined threshold is 4 km (or approximately 13 kft). Based on the inputs, the Layer 1 module 208 derives information relating to the loop, including an estimation of the loop length 242 and the termination type on the loop 241.

It should be emphasized that depending on whether the Layer 1 module 208 determines that the loop under test is not a straight loop, the Layer 1 module 208 may raise various flags 233 to denote that any further analyses may be inaccurate. For example, in the event that the loop is determined to be a long loop, the Layer 1 module 208 will flag that the measuring capabilities of the overall system has been exceeded. As a result, an indicator or flag of some type may be raised. As another example, the Layer 1 module might raise a flag if the presence of a bridge tap is detected or based on some anomaly observed in the S11 signal, an inconsistency is detected in the loop under test. The purpose of these indicators or flags is to convey that the derived loop characteristics (e.g., loop length, termination type, loop gauge) might not be accurate.

Figure 3:
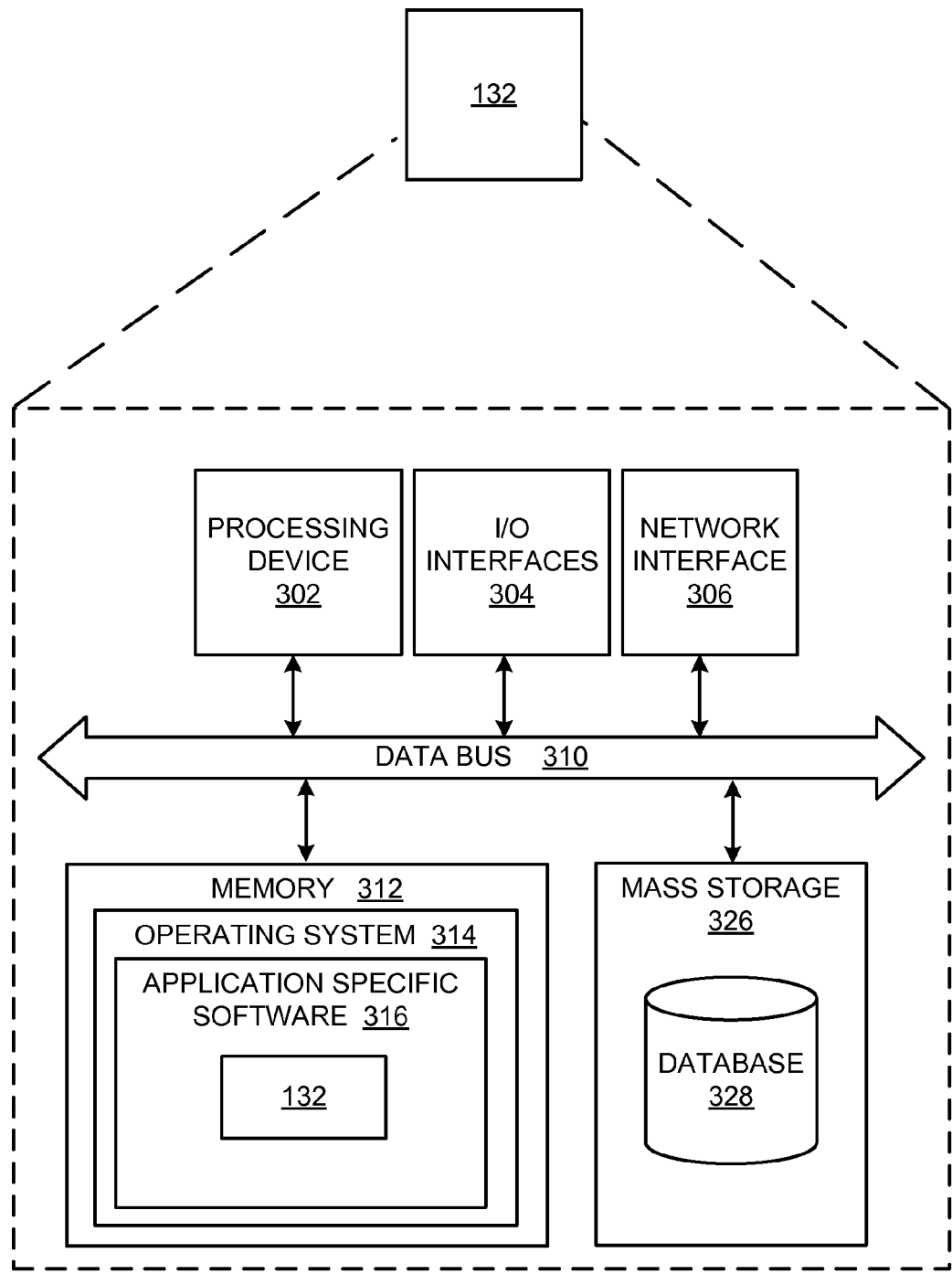
FIG. 3 illustrates an embodiment of the SELT module shown in FIGS. 1 and 2.

Reference is now made to FIG. 3, which illustrates an embodiment of the SELT module shown in FIGS. 1 and 2. Generally speaking, the SELT module 132 may be incorporated into the central office and can comprise any one of a wide variety of computing devices. Irrespective of its specific arrangement, SELT module 132 can, for instance, comprise memory 312, a processing device 302, a number of input/output interfaces 304, a network interface 306, and mass storage 326, wherein each of these devices are connected across a data bus 310.

Processing device 302 can include any custom made or commercially available processor, a central processing unit (CPU) or an auxiliary processor among several processors associated with the SELT module 132, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 such as the SELT module 132 depicted in FIG. 2A. One of ordinary skill in the art will appreciate that the memory 312 can, and typically will, comprise other components which have been omitted for purposes of brevity.

Input/output interfaces 304 provide any number of interfaces for the input and output of data. With further reference to FIG. 3, network interface device 306 comprises various components used to transmit and/or receive data over a network environment. The SELT module 132 may further comprise mass storage 326. For some embodiments, the mass storage 326 may include a database 328 to store and manage such data as metadata.

Figure 4:
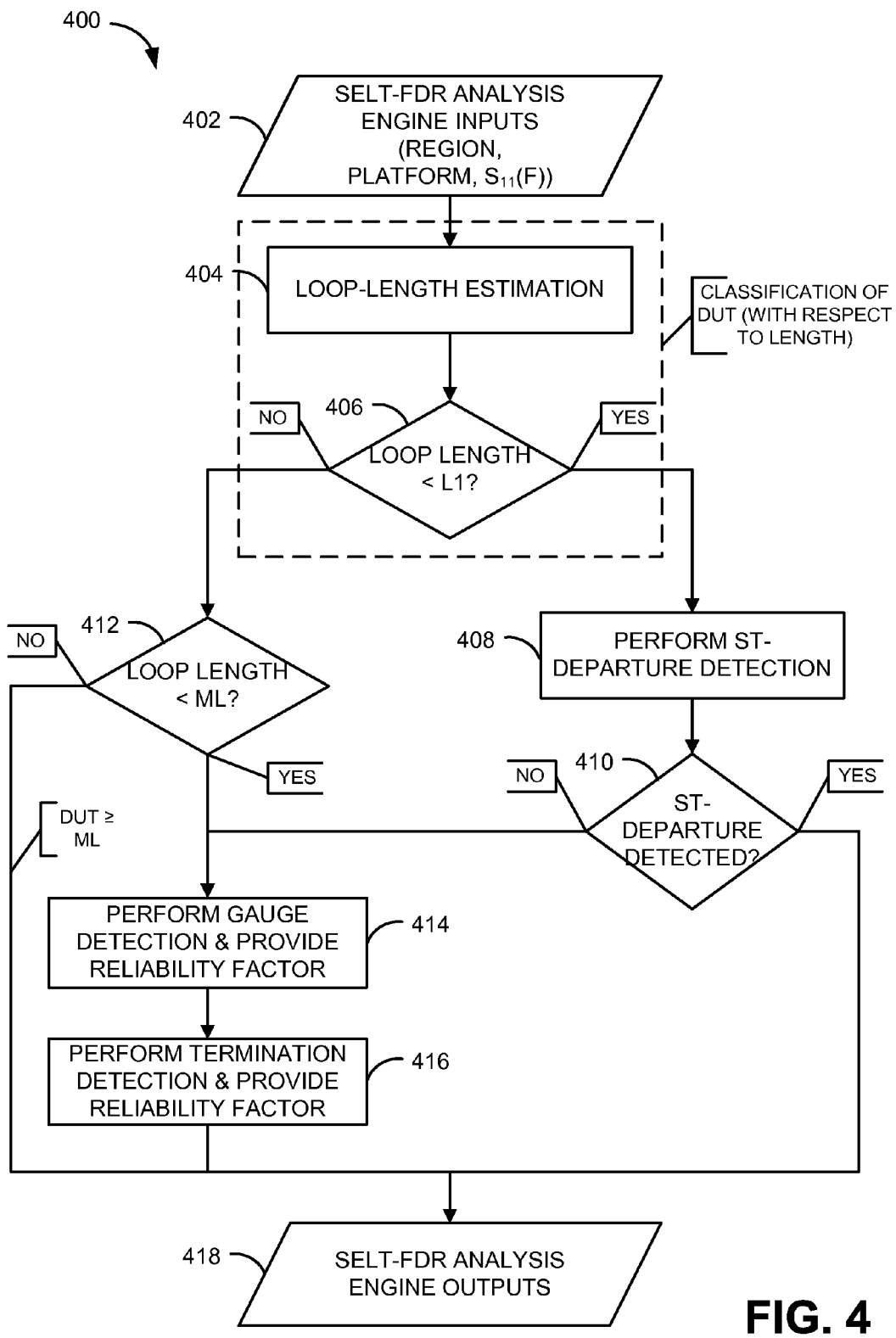
FIG. 4 is a top level flowchart for an embodiment of a process for performing FDR-SELT utilizing the components depicted in FIGS. 1, 2A-B.

FIG. 4 provides a top level flowchart for an embodiment of a process for performing un-calibrated FDR-SELT utilizing the components depicted in FIG. 1, 2A-B. In particular, FIG. 4 is an embodiment of the overall analysis/processing performed using the un-calibrated echo response obtained for a particular loop. In accordance with exemplary embodiments, the steps discussed below may be performed by the FDR-SELT module 132 shown in FIG. 2A. Based on the un-calibrated echo response, such metrics as loop length, termination type, and loop gauge can be derived. The presence of any inconsistency in the raw echo signal leading to departure from straight-loop signal characteristics (e.g., inconsistencies owing to the presence of a bridge tap) can also be determined based on the echo response.

Step 402 begins by receiving the un-calibrated signal S11, platform, and region associated with the loop. In step 404, loop length estimation is performed. If the loop length is less than a threshold L1 (decision block 406), then a subsequent check is performed to determine whether the loop length is less than a second threshold ML, where ML is greater than or equal to L1, in decision block 412. As a non-limiting example, the value of L1 may be set to 9 kft (for North American loops). The threshold value L1 represents an intermediate loop length used to classify the DUT. Based on how the loop is classified, a particular method for estimating the loop length may be performed. The threshold value L1 represents the maximum loop length at which the raw echo signal can be analyzed to determine whether the DUT is a straight loop (or is a departure from a straight loop). Step 404 and decision block 406 generally comprise the process of classifying the loop (or DUT) based on the loop length. It should be appreciated that the value of ML may extend up to 13.2 kft (~4 km). More details regarding determination of the loop classification type are provided below.

Referring back to decision block 412, if the loop length is greater than or equal to ML, then the steps involving loop gauge detection and loop termination detection are bypassed as attempts to determine these metrics may yield inaccurate results. If the loop length is less than threshold ML, then the loop gauge is detected and a corresponding reliability factor is derived (step 414). In step 416, the loop termination type and corresponding reliability factor is determined. This information, along with the loop length estimation, is then output in step 418. With reference back to decision block 406, if the loop length is less than threshold L1, then in step 408, a determination is made on whether the loop is a straight-loop (ST) departure, which may be due to, for example, the presence of a bridge tap, inappropriate joints in concatenated loops etc. If a straight-loop departure is detected, then the loop gauge and loop termination type are not determined. For some embodiments, a constant value such as "−1" may be output in step 418 to indicate that the steps for determining the loop gauge and loop termination type (i.e., steps 414, 416) were bypassed. If the loop is a straight loop, then steps 414 and 416 are performed.

Detection of Straight-Loop Departure

Figure 5:
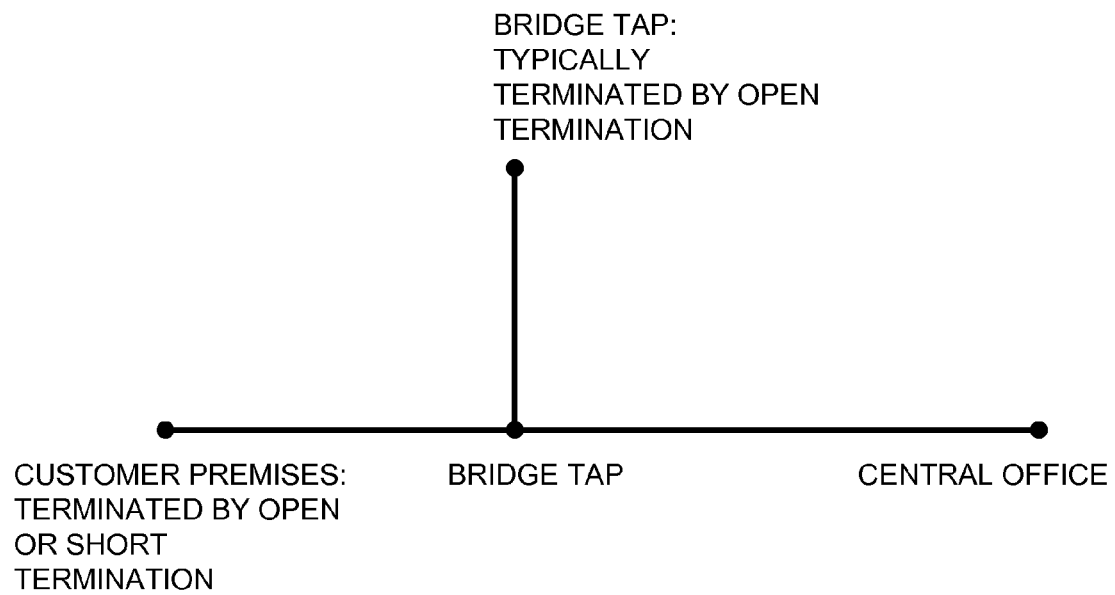
FIG. 5 illustrates the presence of a bridge-tap between the central office and customer premises equipment.

With reference to FIG. 5, the presence of a straight-loop departure between the central office and customer premises can affect the quality of service in a given subscriber loop. As such, exemplary embodiments are described for determining whether a straight-loop departure condition exists. The determination is accompanied by a reliability factor, which provides an indication of the reliability of the detection process.

For purposes of nomenclature, the phrase "straight-loop (ST) departure" generally refers to the detection of such conditions as bridge taps (BT) on the loop under test. It should be emphasized that a ST departure condition may be caused by other conditions other than bridge taps. The detection of a straight-loop departure relies on the presence of a number of characteristics in the echo signal that are ideally not exhibited by straight loops. For purposes of nomenclature, these characteristics will be referred to as "differentiating features" or "differentiating characteristics" in the context of detecting straight-loop departures. These characteristics may exist not only due to the presence of bridge tap loops but also due to other loop condition such as inappropriate joints in concatenated segments of a straight loop, home wiring, etc.

Various differentiating characteristics are thus relied upon to determine whether a loop other than a straight loop exists (i.e., a "straight-loop departure" condition exists). These differentiating characteristics generally relate to maxima and minima values and the distribution of the spacing between successive maxima and minima of the filtered and un-filtered echo signal (S11) over a specified bandwidth. Accordingly, exemplary embodiments described herein utilize various thresholds and tolerances that are carefully tuned in order to increase the probability of correct detection of ST-departure while at the same time reducing the probability of erroneously flagging a straight loop as a ST-departure.

Figure 6:
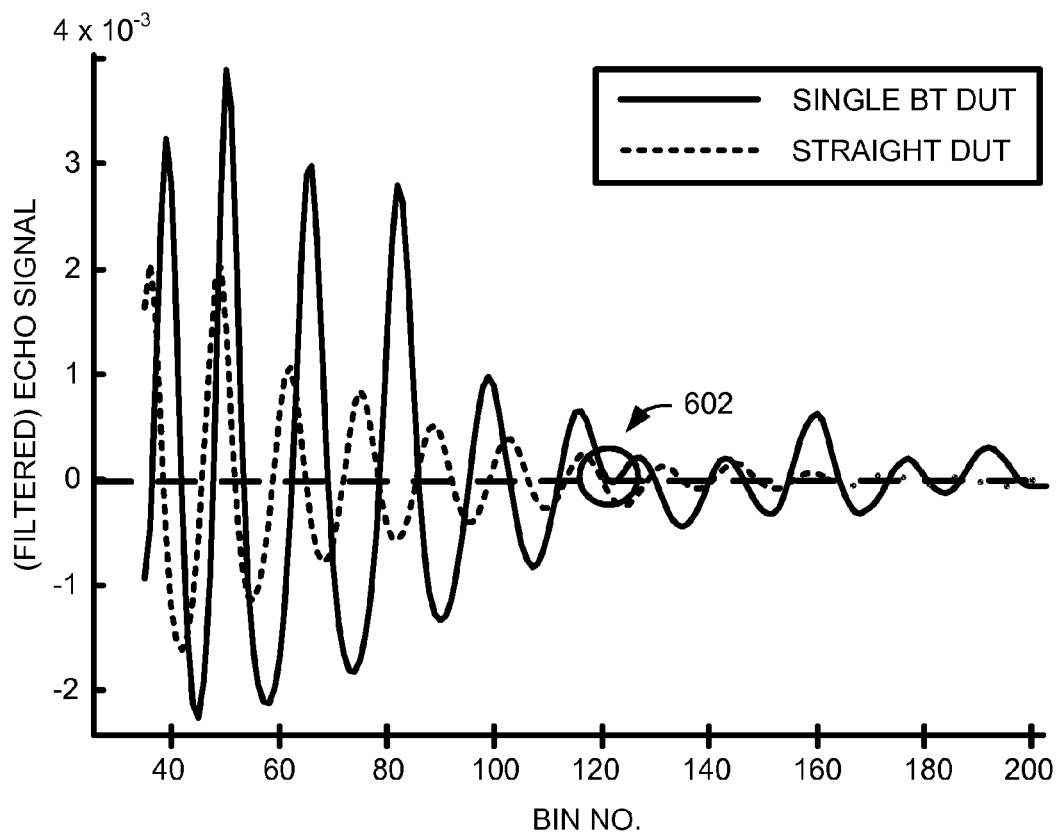
FIGS. 6-9 depict plots comparing un-calibrated echo signals corresponding to loops with and without a bridge tap.

In accordance with exemplary embodiments, the decision criterions described below are considered in order to determine whether a straight-loop departure condition exists. The term "local" is used herein to indicate that the minima/maxima values are identified with respect to the specified observation bandwidth (i.e., local to the specified bandwidth in which ripples characteristics are observed). Moreover, the term minima refers to dips in the echo signal ripple and the term maxima refers to peaks in the echo signal ripple. With reference to FIG. 6, the largest local minima relative to the average local minima value is examined over a specified bandwidth. In the example plot shown in FIG. 6, the largest local minima is marked by the circle 602. A determination is made that a straight-loop departure condition exists if the highest local minima (or dip value) detected is larger than the average local minima by a predetermined percentage.

Figure 7:
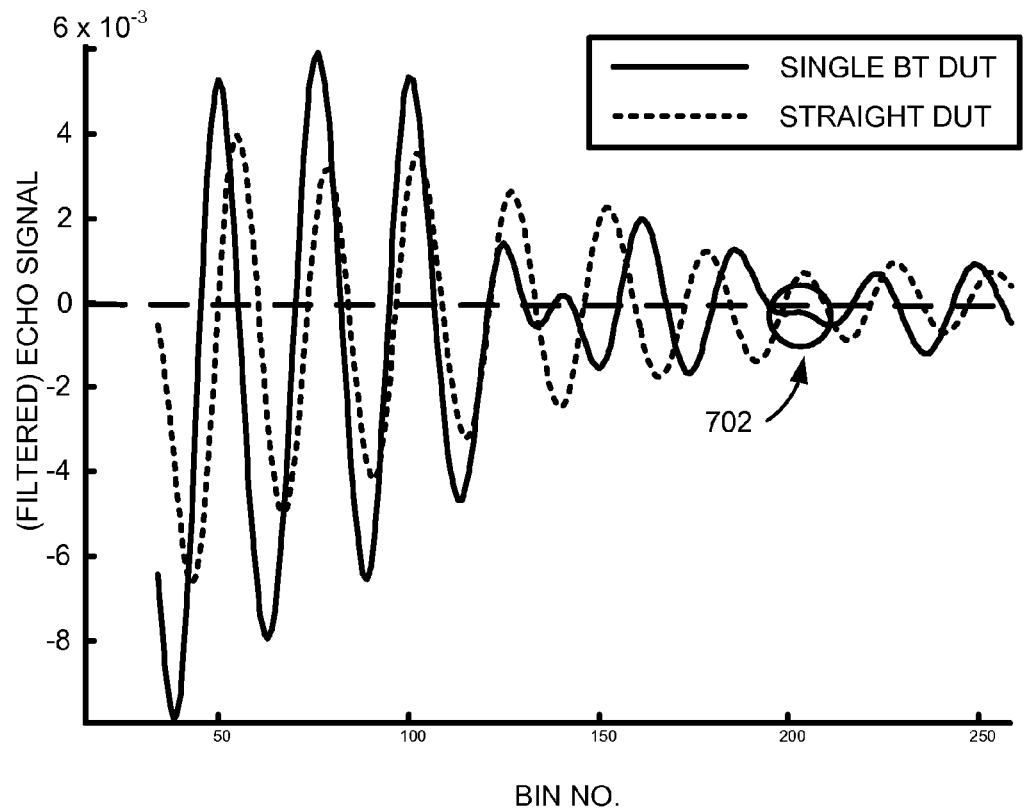

With reference to FIG. 7, another differentiating feature or characteristic that is monitored is the smallest local maxima relative to the average local maxima value. In the example plot shown in FIG. 7, the smallest local maxima is marked by the circle 702. A determination is made that a straight-loop departure condition exists if the lowest local maxima (peak value) detected is smaller than the average local maxima by a predetermined percentage.

Figure 8:
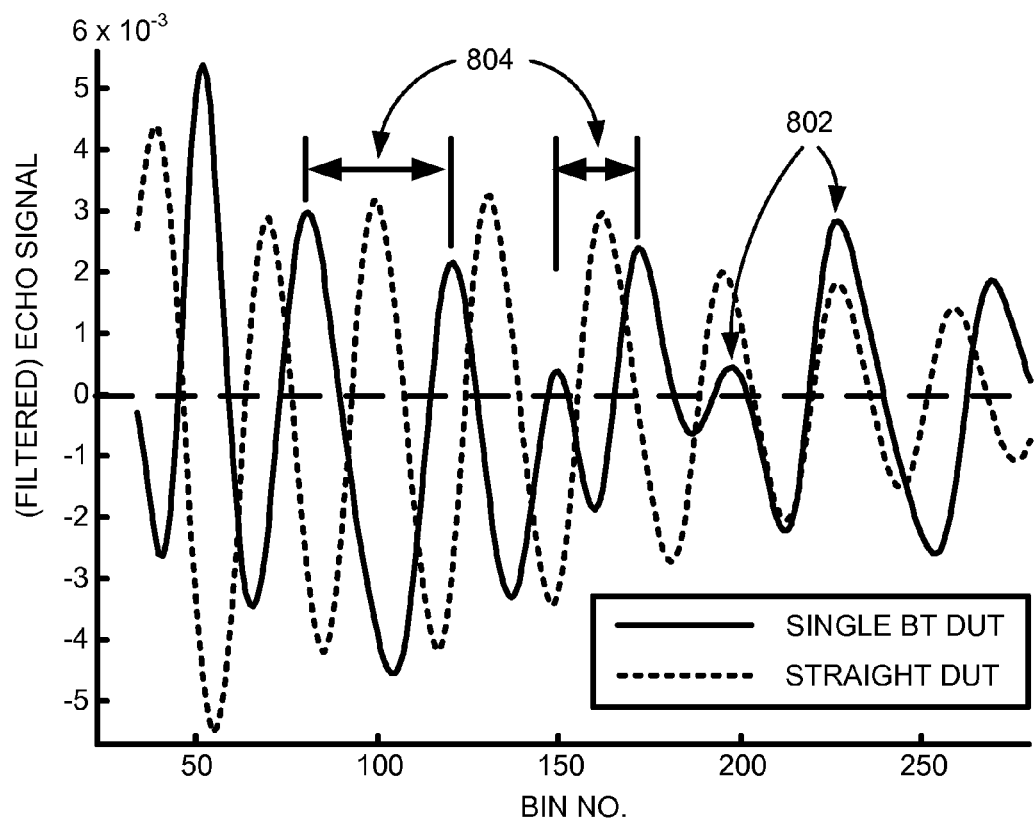

Another differentiating feature or decision criterion relates to the largest fraction of the local maxima with respect to the next adjacent local maxima. With reference to FIG. 8, a determination is made that a departure from a straight-loop condition is present if a local maxima is less than the next local maxima by a predetermined fraction. In particular, the relative difference in amplitude levels for adjacent peaks 802 is monitored.

Another differentiating feature relates to the gaps between peaks. For purposes of nomenclature, local maxima gaps refer to absolute differences in positions of successive local maxima, and local minima gaps refer to absolute differences in positions of successive local minima. The highest relative difference (i.e., higher than the average ripple-gap) in the local minima gaps is observed. A determination is made that a ST-departure condition is present if the gap associated with the local maxima is greater than a specified fraction of the average ripple gap. In particular, the determination is made that a ST-departure condition is present if there is an inconsistent gap between adjacent peaks 804.

Figure 9:
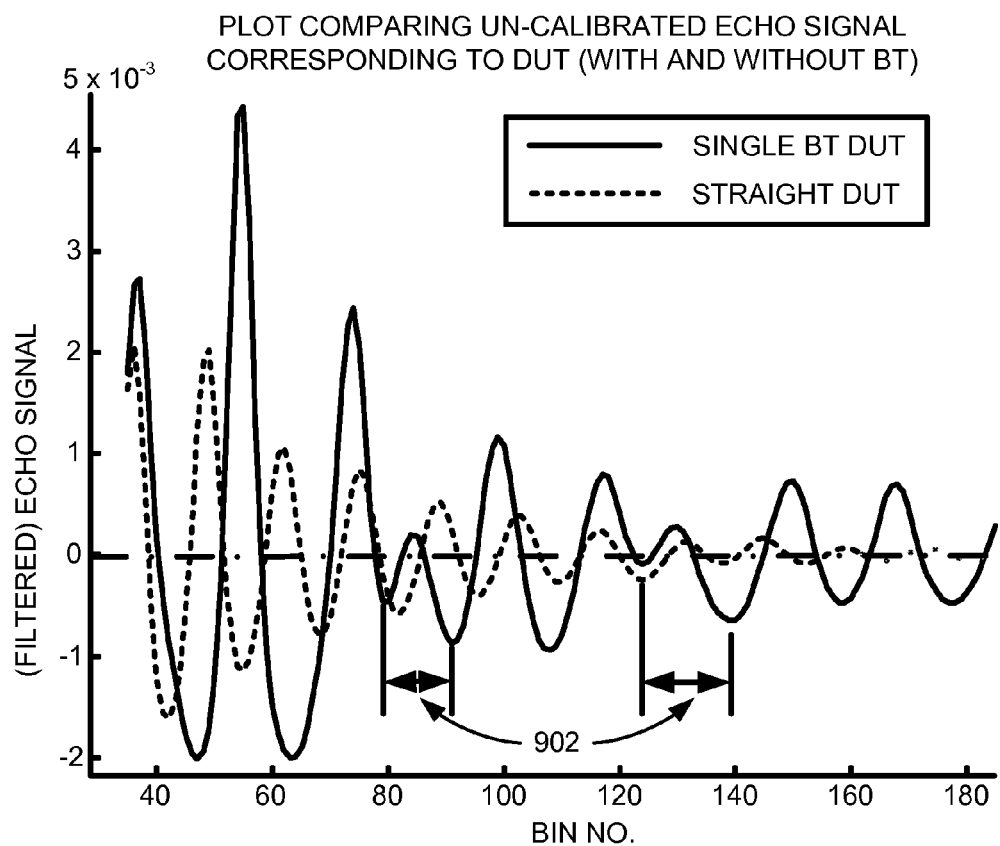

Finally, the lowest relative difference (i.e., differences less than the average ripple gap) in local minima gaps is observed. As illustrated in FIG. 9, a determination is made that a ST departure condition is present if the gap associated with the local minima is smaller than a predetermined fraction of the average ripple-gap. In particular, inconsistent gaps 902 between adjacent local minima are monitored. In accordance with exemplary embodiments, the criteria set forth above are used to determine whether a ST departure condition is present. Based on the platform, gauge (if known) and the estimated loop length, threshold or tolerance values with respect to each decision criterion and observation bandwidth (i.e., the number of bins over which to monitor the differentiating criteria) are selected from a look-up table. It should be noted that for various embodiments, these thresholds and tolerance margins are carefully selected in order increase the probability of correct detection while at the same time, limit the probability of erroneously flagging the existence of a ST-departure condition.

Figure 10A:
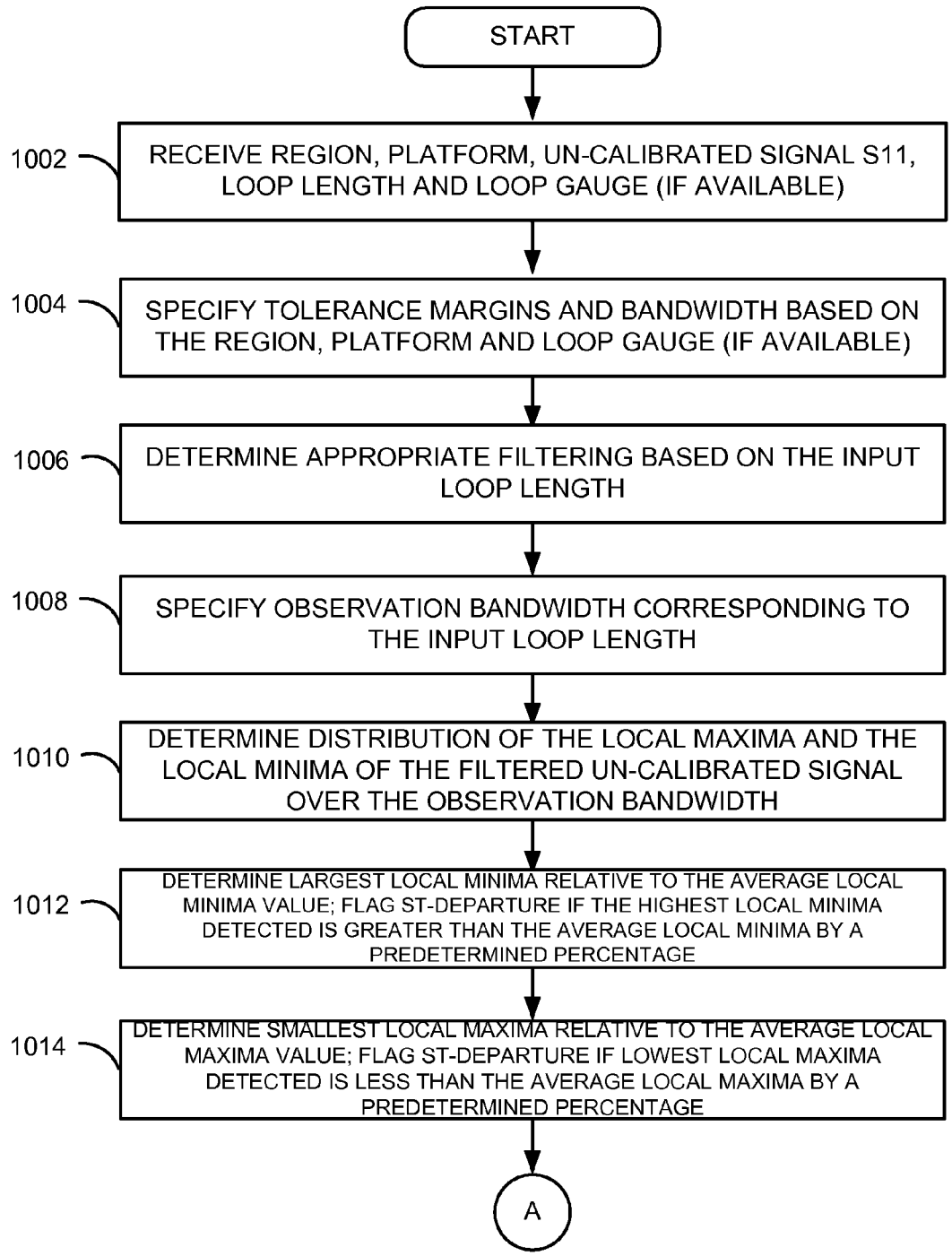
FIGS. 10A-C depict a flowchart of an embodiment for determining whether a straight-loop departure condition exists, based on a number of differentiating features, as depicted in FIG. 4.
Figure 10B:
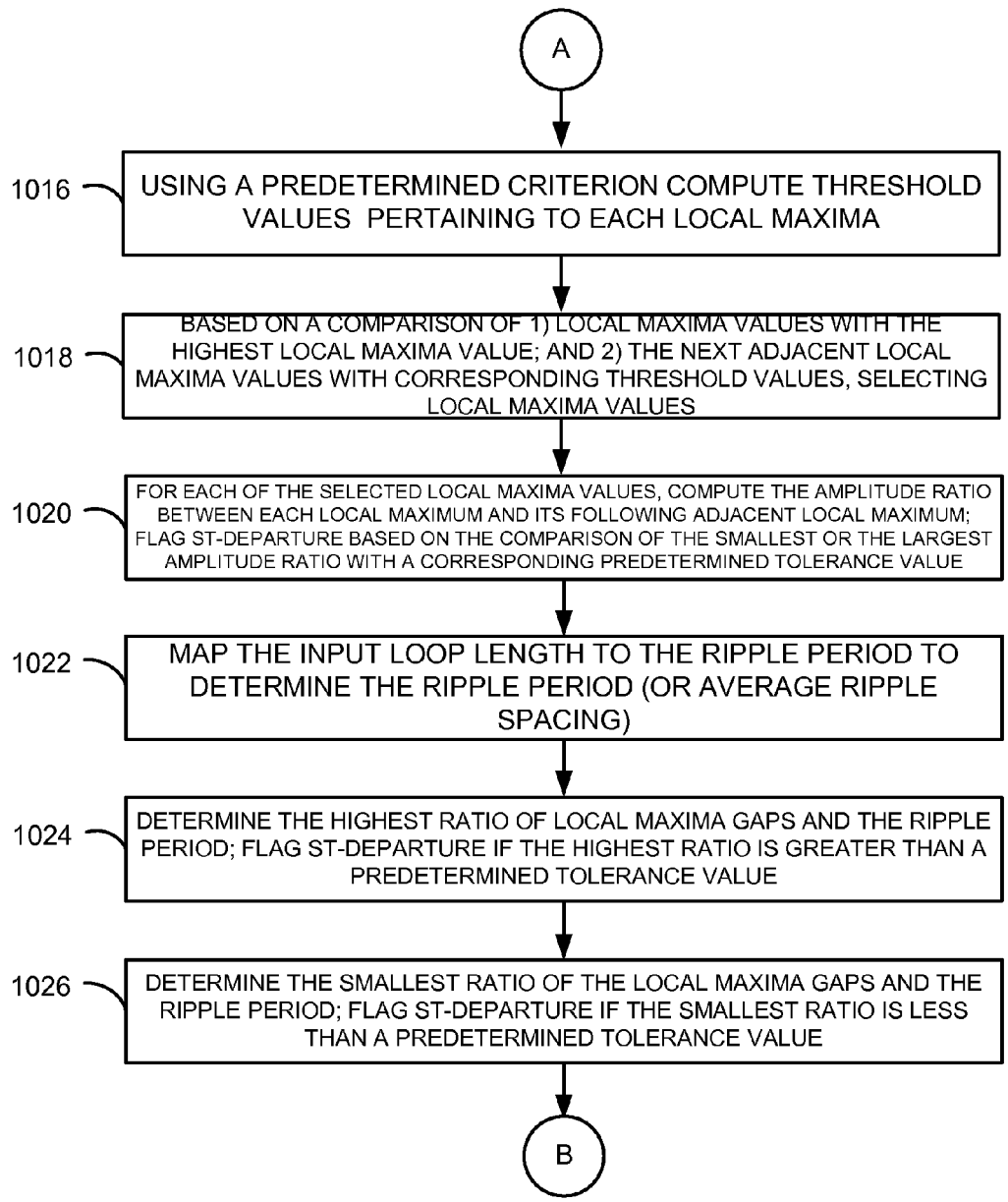
Figure 10C:
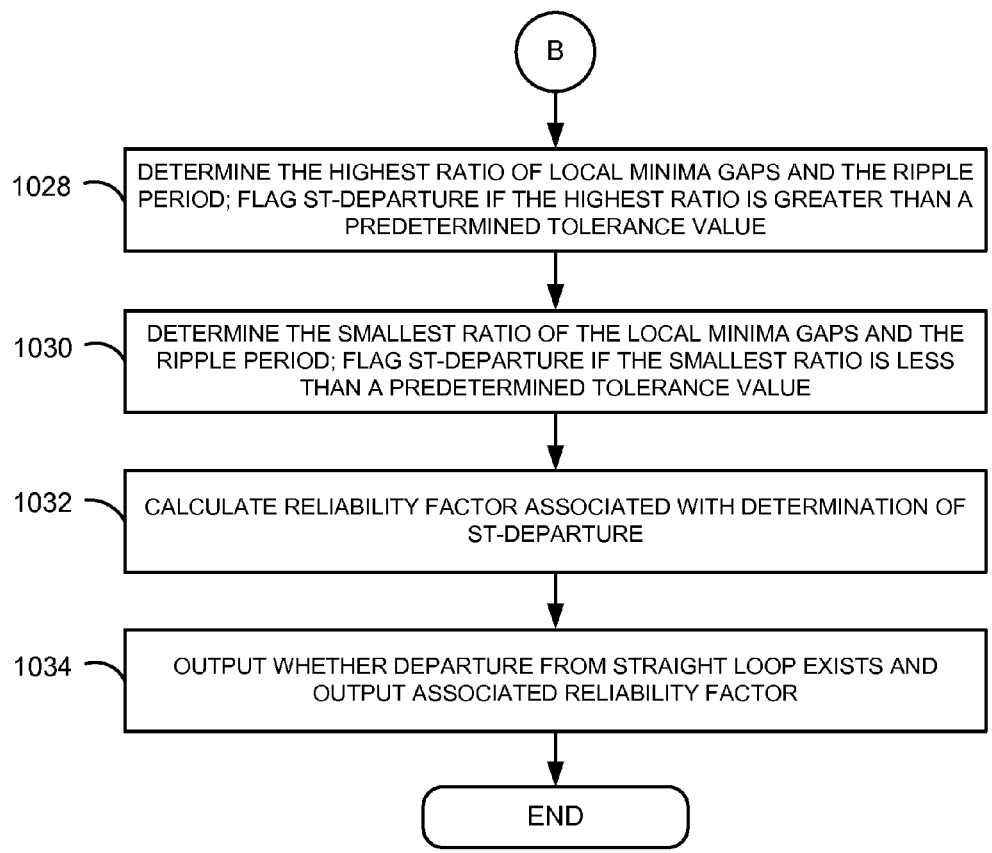

FIG. 10A-C depicts a flowchart of an embodiment for determining whether a loop under test is a straight-loop departure based on the differentiating factors described above. Step 1002 begins by receiving the region, platform, un-calibrated echo signal S11 and loop length. Furthermore, if the loop gauge is known, this information is also received. In step 1004, tolerance margins are specified based on the region, platform, and the loop gauge (if available). In step 1006, appropriate filtering is determined based on the estimated loop length specified in step 1002. In accordance with some embodiments, the filtering may comprise a combination of low-pass and high-pass filters. The filtering selected is based on the fact that the un-calibrated echo signal S11 experiences more attenuation at increasing loop lengths. Appropriate filtering helps to ensure that relevant features in the signal can be processed and that relevant characteristics can be extracted.

In step 1008, an observation bandwidth is specified based on the loop length estimate. The observation bandwidth is defined as the band across which the local maxima and minima in the filtered S11 signal occur consistently. The ripple characteristics of the filtered un-calibrated echo signal S11 are then analyzed. In particular, the distribution of local maxima and local minima of the filtered un-calibrated echo signal is determined over the observation bandwidth (step 1010).

In accordance with some embodiments, if any of the following conditions or "differentiating characteristics" (ideally observed in loops that are not straight) described below are present in the echo signal or filtered version of the same, a straight-loop departure is determined. For some embodiments, the individual decisions are merged to make a final determination on whether a straight-loop departure condition exists. In step 1012, the first criteria or differentiating characteristic involves determining the largest local minima relative to the average local minima value. A straight-loop departure is determined if the highest local minima detected is greater than the average local minima by a predetermined percentage. In some embodiments, this percentage is predetermined based on the platform type specified in step 1002.

Step 1014 relates to the second criteria and is directed to determining the smallest local maxima relative to the average local maxima value. A straight-loop departure is determined if the lowest local maxima detected is less than the average local maxima by a predetermined percentage, which is also based on the platform type. In step 1016, threshold values pertaining to each local maxima are computed based on predetermined criteria. These threshold values are utilized in step 1018, where a comparison is performed between 1) local maxima values and the highest local maxima value; and 2) the next adjacent maxima values with corresponding threshold values. Based on these comparisons, local maxima values are selected.

In step 1020, for each of the selected local maxima values, the amplitude ratio between each local maximum and its following adjacent local maximum is calculated. A straight-loop departure is then determined based on the amplitude ratios. For some embodiments, the smallest amplitude ratio is identified from among all the calculated amplitude ratios, and a straight-loop departure is determined if the smallest identified amplitude ratio is less than a predetermined tolerance. For such embodiments, the amplitude ratio may be calculated as a ratio of each local maximum value over its following adjacent local maximum value. In accordance with other embodiments, the largest amplitude ratio is identified, and a straight-loop departure is determined if the largest identified amplitude ratio is greater than a predetermined tolerance. For such embodiments, the amplitude ratio may be calculated as the inverse of the ratio of each local maximum value over its following adjacent local maximum value.

In step 1022, the input loop length is mapped to the ripple period in order to determine the ripple period or average ripple spacing. In step 1024, the highest ratio of local maxima gaps to the ripple period is examined. A straight-loop departure is determined if the highest ratio is greater than a predetermined tolerance value. In step 1026, the smallest ratio of local maxima gaps to the ripple period is examined. A straight-loop departure is determined if the smallest ratio is less than a predetermined value.

For the next criteria (step 1028), the highest ratio of the local minima gaps to the ripple period is examined. A straight-loop departure is determined if this ratio is greater than a predetermined tolerance value. In step 1030, the smallest ratio of the local minima gaps to the ripple period is examined. A straight-loop departure is determined if this ratio is less than a predetermined tolerance value. It should be noted that the predetermined tolerance values referred to in the preceding steps are obtained in step 1004.

In step 1032, a reliability factor is determined. In accordance with some embodiments, this reliability factor may be derived based on a majority criterion where the number of criteria described in the preceding steps is used as a reliability factor. In this regard, as more conditions are met, the straight-loop departure determination becomes more reliable. In accordance with other embodiments, a distance metric may also be utilized to derive the reliability factor. For some embodiments, the Euclidean distance between the predetermined tolerance values and the actual observed value is measured. The larger the Euclidean distance, the more reliable the determination is. In step 1034, the reliability factor and a final indication of whether a ST-departure condition exists are output. It should again be emphasized that the embodiments described above should not be limited to the particular sequence of steps described. As one of ordinary skill in the art will appreciate, other sequences of steps may be possible, and the particular order of steps set forth herein should not be construed as limitations on the claims.

It should be noted that for the exemplary embodiments described above, a priori knowledge of the loop gauge and termination type is not required for determining whether a ST-departure condition exists. Based on examination of the various differentiating characteristics/features described above, a determination is made on whether a straight-loop departure exists between the central office and the customer premises on the subscriber loop. As described above, the analysis is based on various differentiating features found in the un-calibrated echo signal such as the distribution of relevant minima and maxima.

Determination of Loop Gauge

Generally, information on the particular loop gauge can be valuable information as the loop gauge can be used to determine the data-rate that can be supported on a line. As non-limiting examples, the loop gauge may be determined to be 24 AWG, 26 AWG for North American loops and 0.4 paper, 0.4 poly, 0.65 poly for Japanese loops.

Figure 11:
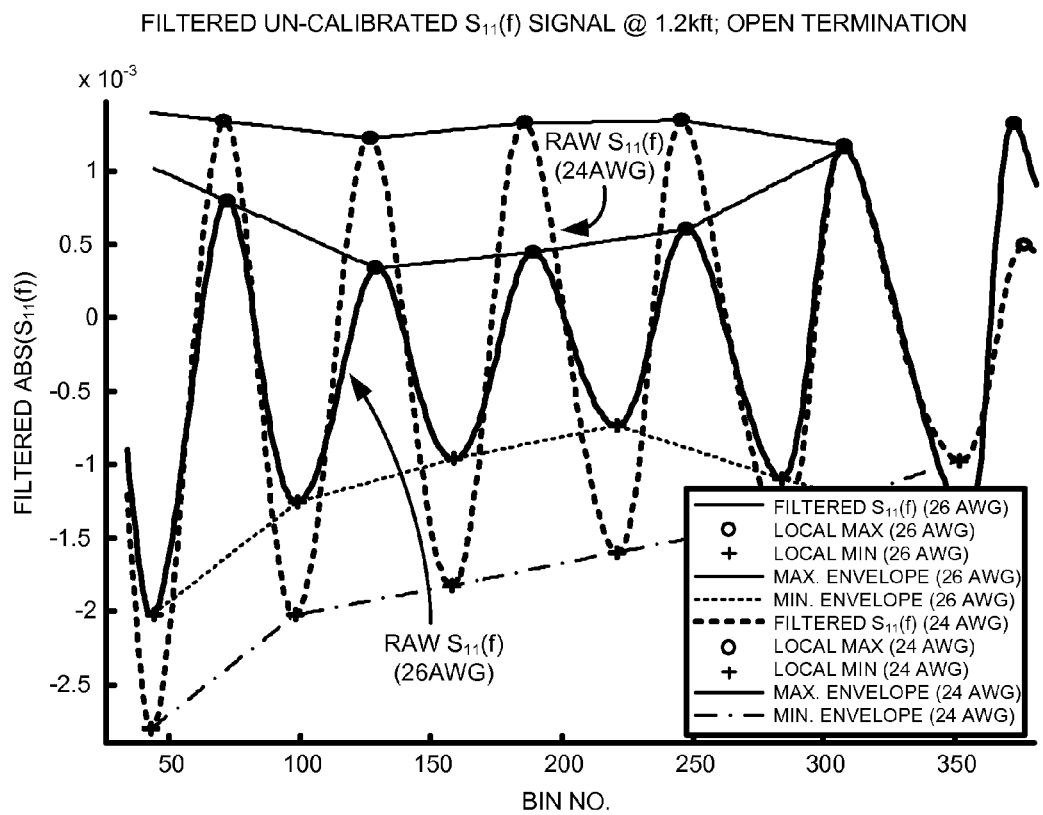
FIG. 11 illustrates the envelope of maxima and minima for both 26 AWG and 24 AWG at a loop length of 1.2 kft.

By analyzing the un-calibrated S11 response, the loop gauge may be determined by monitoring the relative spacing between local maxima and local minima of the filtered and unfiltered un-calibrated echo signal S11. In particular, for a given loop length, the gauge of a particular loop affects the attenuation of the signal. The filtered absolute value of the un-calibrated echo signal for a straight loop at 1.2 kft is plotted as a function of frequency in FIG. 11. Also shown in FIG. 11 is the envelope of maxima and minima for both 26 AWG and 24 AWG at a loop length of 1.2 kft. By analyzing certain characteristics of the FDR-SELT echo (as depicted in FIG. 11), thresholds can be incorporated to differentiate between different gauges for various loop lengths.

Figure 12A:
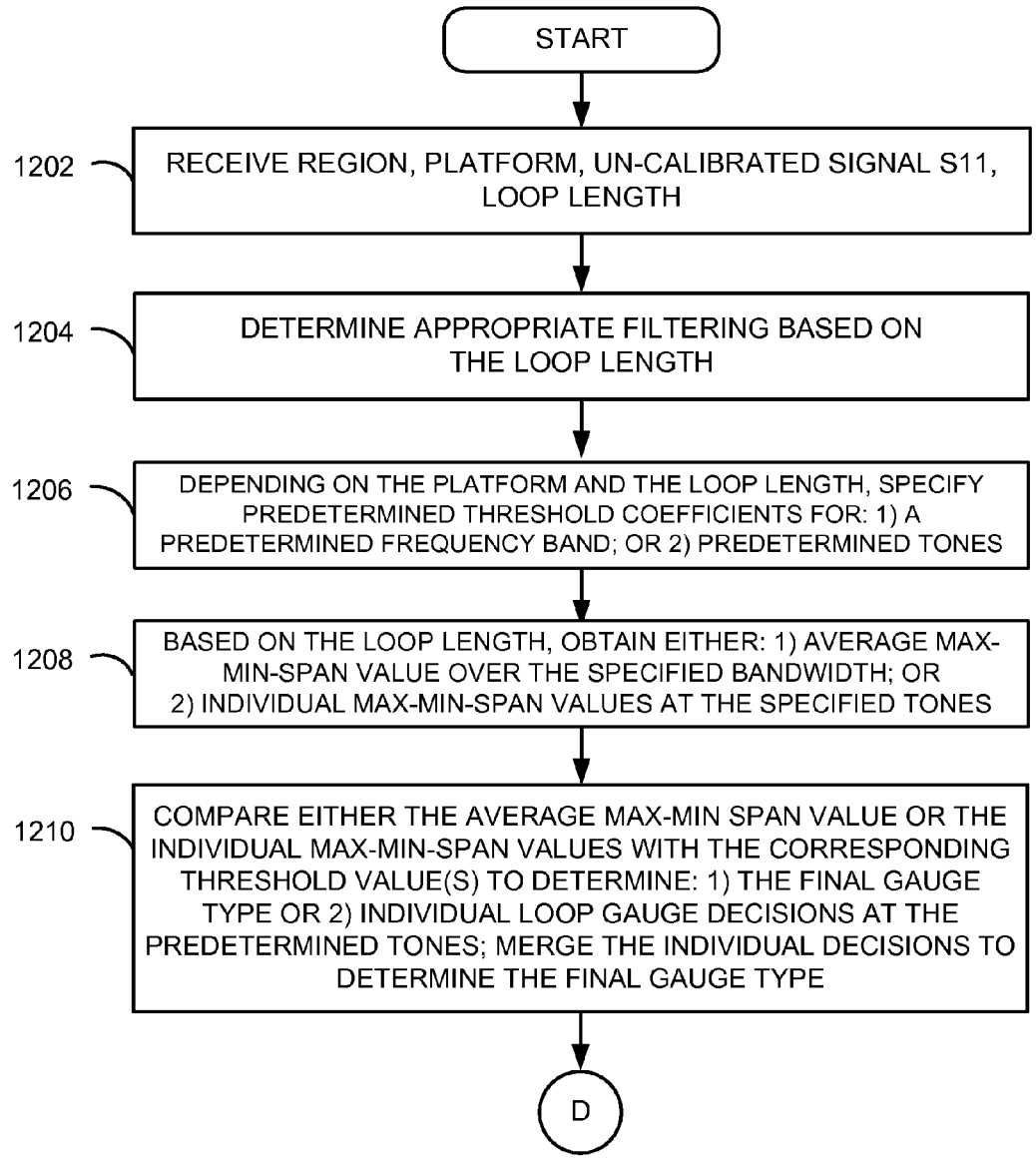
FIG. 12A-B depict a flowchart of an embodiment for determining the loop gauge, as depicted in FIG. 4.
Figure 12B:
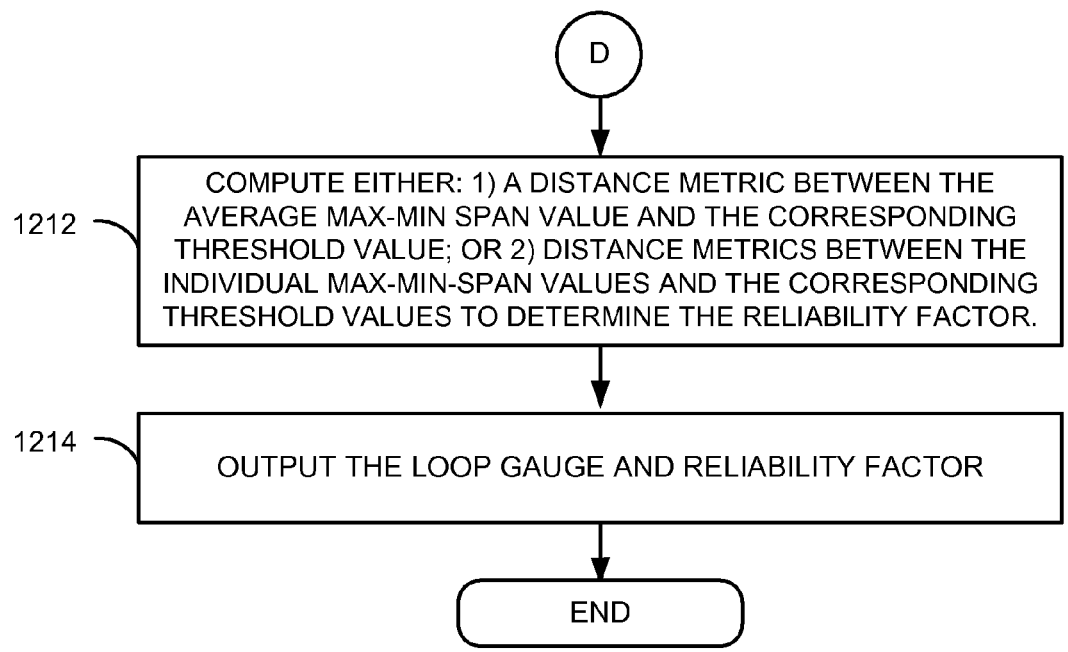

FIG. 12A-B depict a flowchart of an exemplary embodiment for determining the loop gauge of a loop under test. The loop gauge is determined based on information relating to the average amplitude difference between local maxima and local minima values (also referred to herein as the maxima-minima span) of the filtered signal at a specified frequency range. Step 1202 begins by receiving the un-calibrated signal S11, along with the region, platform and loop length. In step 1204, the appropriate filtering to be applied to the un-calibrated echo signal is selected based on the loop length estimate. In accordance with exemplary embodiments, a combination of high-pass and low-pass filtering may be applied for various loop lengths in order to accentuate ripples inherent in the echo signal S11 and also to remove any unwanted high-frequency background noise.

Based on the platform and loop length, predetermined threshold coefficients are specified over a predetermined frequency band or for individual tones (step 1206). In step 1208, either the average maxima-minima span over the frequency band or the individual maxima-minima span values for the individual tones are obtained. As a non-limiting example, this depends on the loop length as utilizing the average maxima-minima span to determine loop gauge becomes more difficult with increasing loop lengths. Thus, for loop lengths exceeding a predetermined threshold, maxima-minima span values are obtained at individual tones. For some embodiments, this predetermined threshold is equal to the L1 threshold described earlier. Accordingly, based on the loop length, either the average maxima-minima span or the individual maxima-minima span values are utilized to determine the loop gauge (step 1210). The average maxima-minima span is compared with a predetermined threshold to determine the loop gauge, where the predetermined threshold is based on the platform and the loop length. Alternatively, the individual maxima-minima spans at individual tones are each compared to corresponding predetermined thresholds at those particular tones. In such instances, the individual decisions regarding the loop gauge are merged to obtain a final loop gauge.

It should be noted that based on the received inputs (platform design and loop length), appropriate thresholds and the corresponding bandwidth (i.e., the number of bins across which to evaluate the differentiating criterion) may be selected from a pre-defined look-up table, for example. With reference back to step 1210, a reliability factor relating to the loop gauge determination may be computed based on whether an average maxima-minima span value or individual maxima-minima span values were utilized to determine the loop gauge. The reliability factor corresponds to the confidence in the detection outcome. Accordingly, in step 1212, a reliability factor is computed based on either: 1) a distance metric between the average maxima-minima span and the corresponding threshold value; or 2) distance metrics between the individual maxima-minima span values and corresponding threshold values. In cases where there are multiple distance metrics, the individual distance metrics may be merged. Furthermore, for some embodiments, the distance metric may comprise Euclidean distance. In step 1214, the reliability factor and the final loop gauge determination are output. Finally, it should be noted that the exemplary embodiments described above are platform dependent (i.e., dependent on the design) but are independent of the ports employed. Furthermore, a priori knowledge of the loop termination is not required.

It should be noted that the invention is not limited to the embodiments described above. Further, it should be noted that variations and modifications may be made to the above-described embodiments without departing from the principles of the present disclosure such that any number of regions can be supported. Accordingly, it should be emphasized that the above-described embodiments are merely examples of possible implementations. All such modifications and variations are intended to be included herein within the scope of this disclosure and protected by the following claims.

At least the following is claimed:

1. A method for determining whether a straight-loop departure condition exists on a loop under test, the loop connecting a customer premise equipment (CPE) modem to the central office (CO) modem in a communication system, comprising:
   receiving, at the CO modem or CPE modem, an un-calibrated echo signal for the loop under test using frequency domain reflectometry single-ended line testing (FDR-SELT), a geographical region associated with the loop under test, a platform type for the loop under test, and a loop length estimate of the loop under test;
   based on the geographical region, platform type, and loop length estimate, identifying an observation bandwidth and one or both of local maxima and local minima criteria, wherein the observation bandwidth identifies specific bins in which the un-calibrated echo signal is compared to the local maxima and local minima criteria; and
   determining whether the loop is not a straight loop, wherein determining whether the loop is not a straight loop comprises determining whether one or more of local maxima and local minima within the identified observation bandwidth in the un-calibrated echo signal satisfy the identified one or both local maxima and local minima criteria.

2. The method of claim 1,
   wherein identifying the one or both of local maxima and local minima criteria includes specifying a plurality of tolerance margins based on the geographical region and platform type; and
   wherein the method further comprises filtering the un-calibrated echo signal, wherein the filtering applied is based on the loop length estimate, and wherein the observation bandwidth is a frequency band across which ripple characteristics of the filtered un-calibrated echo signal are observed for determination of the one or both of local maxima and local minima in the filtered un-calibrated echo signal.

3. The method of claim 2, further comprising determining distribution of the local maxima and local minima within the observation bandwidth, wherein determining distribution comprises at least: amplitudes of local maxima and local minima; positions of local maxima and local minima; and gaps between local maxima and local minima, wherein local maxima gaps comprise absolute differences in positions of successive local maxima, and wherein local minima gaps comprise absolute differences in positions of successive local minima.

4. The method of claim 3, further comprising:
   determining a largest local minimum relative to an average value of local minima and determining that a straight-loop departure condition exists if the largest local minimum is greater than the average value by a first tolerance margin; and determining a smallest local maximum relative to an average value of local maxima and determining that a straight-loop departure condition exists if the smallest local maximum is less than the average value by a second tolerance margin.

5. The method of claim 3, further comprising:
selecting a set of local maxima within the observation bandwidth;
for each local maximum within the selected set of local maxima, calculating an amplitude ratio between each local maximum and its following adjacent local maximum;
determining that a straight-loop departure condition exists based on the calculated amplitude ratios.

6. The method of claim 3, further comprising:
determining a ripple period value based on the loop length estimate;
determining a highest ratio between local maxima gaps and the ripple period value with respect to all maxima within the observation bandwidth; and
determining that a straight-loop departure condition exists if the highest ratio is greater than a third tolerance margin.

7. The method of claim 3, further comprising:
determining a smallest ratio between local maxima gaps and the ripple period with respect to all local maxima within the observation bandwidth; and
determining that a straight-loop departure condition exists if the smallest ratio is less than a fourth tolerance margin.

8. The method of claim 3, further comprising:
determining a highest ratio between local minima gaps and the ripple period with respect to all local minima within the observation bandwidth; and
determining that a straight-loop departure condition exists if the highest ratio is greater than a fifth tolerance margin.

9. The method of claim 3, further comprising:
determining a smallest ratio between local minima gaps and the ripple period with respect to all local minima within the observation bandwidth; and
determining that a straight-loop departure condition exists if the smallest ratio is less than a sixth tolerance margin.

10. The method of claim 1, further comprising:
calculating a reliability factor associated with the one or more determinations that a straight-loop departure exists; and
outputting the reliability factor and a final indication of whether a straight-loop departure exists, wherein the final indication is based at least one of the determinations that a straight-loop departure condition exists.

11. The method of claim 10, wherein calculating a reliability factor comprises calculating Euclidean distances between the values corresponding to the differentiating features and the respective predetermined tolerance margins.

12. A method for determining a loop gauge for a loop under test, wherein the loop connecting a customer premise equipment (CPE) modem to the central office (CO) modem in a communication system, comprising:
receiving, at the CO modem or CPE modem, an un-calibrated echo signal for the loop under test using frequency domain reflectometry single-ended line testing (FDR-SELT), a geographical region associated with the loop under test, a platform type, and a loop length estimate of the loop under test;
based on the geographical region, platform type, and loop length estimate, identifying a set of thresholds and specific bins in which the un-calibrated echo signal is compared to the set of thresholds;
analyzing characteristics relating to local maxima and local minima of the un-calibrated echo signal to determine the loop gauge, the analyzing including applying one or more of the identified set of thresholds to the local maxima and local minima;
filtering the un-calibrated echo signal, wherein the filtering is determined based on the loop length;
for loop length estimates less than a predetermined length threshold from the set of thresholds, specifying a first gauge threshold from the set of thresholds for a predetermined frequency band based on the geographical region, platform and loop length estimate; and
calculating an average value of maxima-minima span across the predetermined frequency band;
for loop lengths greater than the predetermined length threshold, specifying a set of gauge threshold values at predetermined frequencies based on the geographical region, platform and loop length estimate; and
calculating maxima-minima span values for each of the predetermined frequencies.

13. The method of claim 12, further comprising:
for loop length estimates less than the predetermined length threshold, comparing the average value of maxima-minima span with the first gauge threshold and based on the comparison, obtaining an overall loop gauge determination;
for loop length estimates greater than the predetermined length threshold, performing individual comparisons between the maxima-minima span values with the set of gauge thresholds to obtain individual loop gauge determinations; and merging the individual loop gauge determinations to obtain an overall loop gauge determination.

14. The method of claim 13, further comprising calculating a reliability factor associated with the overall loop gauge determination.

15. The method of claim 14, further comprising outputting the reliability factor and the overall loop gauge determination.

16. The method of claim 15, wherein calculating a reliability factor further comprises:
for loop length estimates less than the predetermined length threshold, calculating Euclidean distance between the average maxima-minima span and the first gauge threshold value and comparing the Euclidean distance with a predetermined tolerance value to derive a reliability factor associated with the overall loop gauge determination;
for loop length estimates greater than the predetermined length threshold, for each predetermined frequency, calculating a Euclidean distance between the maximum-minimum span value and the corresponding gauge threshold value and comparing the Euclidean distance with a predetermined tolerance value to derive an individual reliability factor associated with each individual loop gauge determination; and
merging the reliability factors to derive an overall reliability factor.

17. A system comprising:
a first module coupled to a loop, the first module configured to generate a test signal and receive an un-calibrated echo response of the loop; and
a second module configured to receive the un-calibrated echo response measurement from the first module, wherein the second module is further configured to:
receive a geographical region, platform type, and a loop length estimate;
based on the geographical region, platform type, and loop length estimate, identify an observation bandwidth and one or both of local maxima and local minima criteria, wherein the observation bandwidth identifies specific bins in which the un-calibrated echo signal is compared to the local maxima and local minima criteria; and
determine whether the loop is not a straight loop by determining whether one or more of local maxima and local minima within the identified observation bandwidth in the un-calibrated echo signal satisfy the identified one or both local maxima and local minima criteria.

18. The system of claim 17, wherein the first module comprises:
a signal generator to send a test signal onto the loop;
an analyzer configured to measure scattering parameters (s-parameters) based on the reflected signal and determine the echo response of the loop.

19. The system of claim 17, wherein the second module further comprises:
a filter module for filtering the un-calibrated echo signal based on the loop length estimate;
logic for identifying the observation bandwidth based on the loop length estimate, wherein the observation bandwidth is a frequency band across which ripple characteristics of the filtered un-calibrated echo signal are observed for determination of the one or both of local maxima and local minima in the filtered un-calibrated echo signal;
logic for determining distribution of local maxima and local minima of the filtered un-calibrated echo signal;
logic for analyzing the ripple characteristics to determine whether one or more differentiating features are present based on the one or both of local maxima and local minima and the one or both of the identified local maxima and local minima criteria; and
logic for determining that a straight-loop departure condition exists if at least one differentiating feature is present.

20. The system of claim 19, further comprising:
logic for calculating a value reflecting reliability of the determination that a straight-loop departure condition exists; and
logic for outputting the reliability value and indicating whether a straight-loop departure condition exists.

21. A system comprising:
a first module coupled to a loop, the first module configured to generate a test signal and receive an un-calibrated echo response of the loop; and
a second module configured to receive a geographical region, a platform type, and a loop length estimate, wherein the second module is further configured to determine loop gauge of the loop based on the geographical region, platform type, and loop length estimate by:
identifying a set of thresholds for the geographical region, platform type and loop length estimate, and further identifying specific bins in which the un-calibrated echo signal is compared to the thresholds; and
analyzing characteristics relating to local maxima and local minima of the un-calibrated echo signal, the analyzing including applying one or more of the identified set of thresholds to the local maxima and local minima,
wherein the second module further comprises:
a filter module for filtering the un-calibrated echo signal based on the loop length estimate;
logic for calculating one of: an average amplitude difference between local maxima and local minima of the filtered echo signal across a predetermined frequency range; and amplitude difference values between local maxima and local minima of the filtered echo signal at predetermined frequencies;
logic for comparing one of: the average amplitude difference with a predetermined first gauge threshold from the set of thresholds to determine the loop gauge; and individual amplitude differences with predetermined gauge thresholds from the set of thresholds to obtain individual loop gauge determinations; and
logic for merging the individual loop gauge determinations to determine an overall loop gauge.

22. The system of claim 21, wherein the first module comprises:
a signal generator to send a test signal onto the loop;
an analyzer configured to measure scattering parameters (s-parameters) based on the reflected signal and determine the echo response of the loop.

23. the system of claim 21, further comprising:
logic for calculating a value reflecting reliability of the loop gauge determination; and
logic for outputting the reliability value and the loop gauge determination.

* * * * *